United States Patent [19]

Fühner

[11] Patent Number: 4,922,809
[45] Date of Patent: May 8, 1990

[54] MACHINE FOR BREWING HOT BEVERAGES

[75] Inventor: Hubert Fühner, Solingen, Fed. Rep. of Germany

[73] Assignee: Robert Krups Stiftung & Co. KG, Solingen, Fed. Rep. of Germany

[21] Appl. No.: 348,356

[22] Filed: May 5, 1989

[30] Foreign Application Priority Data

May 5, 1989 [DE] Fed. Rep. of Germany ....... 3815355

[51] Int. Cl.$^5$ .............................................. A47J 31/00
[52] U.S. Cl. ....................................... 99/283; 99/292; 99/305
[58] Field of Search ................. 99/279, 280, 281, 282, 99/283, 292, 293, 295, 299, 300, 304, 305, 316; 426/433; 126/369, 381

[56] References Cited

U.S. PATENT DOCUMENTS

| 2,088,966 | 8/1937 | Lyons | 99/294 |
| 2,835,782 | 5/1958 | Stiebel | 99/281 |
| 3,450,024 | 6/1969 | Martin | 99/295 |
| 3,793,934 | 2/1974 | Martin | 99/282 |

Primary Examiner—Robert W. Jenkins
Attorney, Agent, or Firm—Peter K. Kontler

[57] ABSTRACT

A machine for brewing hot beverages, such as coffee, has a container for a supply of fresh liquid with two communicating sections one of which communicates with the atmosphere and the other of which has a bottom wall directly above an electric heater. Two or more siphons are used to convey streams of boiling liquid from the other section into a holder for a supply of flavoring agent. The siphons, the holder and at least the second section of the container are made of a non-metallic material (particularly porcelain, certain plastics, glass, ceramic or earthenware) which does not adversely affect the aroma of the beverage.

20 Claims, 3 Drawing Sheets

MACHINE FOR BREWING HOT BEVERAGES

BACKGROUND OF THE INVENTION

The invention relates to improvements in machines for brewing hot beverages by contacting a flavoring agent (such as comminuted coffee beans, tea leaves or pulverized chocolate) with a heated liquid (such as water or milk).

It is well known to provide a coffee or tea making machine with a housing for a container which can store a supply of fresh water, for a heater which raises the temperature of water to a desired value, for a holder which can receive a supply of flavoring agent (e.g., in a customary bag of filter paper), for a riser which supplies hot liquid from the container to the holder, and for various electrical and electronic components including an on-off switch, one or more signal lamps and/or others. The holder discharges a trickle of freshly brewed beverage into a vessel (e.g., into a coffee pot or tea pot) which can be placed onto a warmkeeping plate in order to maintain the temperature of the beverage at a desired value. Reference may be had to numerous types of coffee and tea makers which are produced and distributed by the assignee of the present application.

Automatic electric coffee and tea makers operate quite satisfactorily and are of considerable help in households as well as in offices and in commercial establishments which sell hot beverages. Moreover, such makers can automatically brew requisite quantities of hot beverages with little or no attention on the part of a person in charge. Thus, all that is necessary is to introduce a selected quantity of fresh liquid and a corresponding quantity of flavoring agent and set the machine for automatic operation.

However, hardly any automatic coffee or tea makers receive high marks as concerns the quality of brewed beverages. Tests with automatic brewing machines indicate that the ratings they receive are invariably below "very good". The main reason is that, with reference to automatic coffee makers, the aroma of coffee which has been brewed in an automatic machine is inferior to the aroma of hand brewed coffee (the term "hand brewed coffee" is intended to denote coffee which is brewed by hand, namely by pouring boiling water over a supply of comminuted coffee beans). This can be explained as follows:

When a hot liquid (such as water in the case of making hot coffee) is poured over a supply of comminuted coffee beans, the person in charge of pouring can readily ascertain whether or not the water has been heated to the boiling point. On the other hand, the temperature of heated water which is caused to contact a supply of comminuted coffee beans in an automatic coffee maker is between 85° and 95° C., i.e., invariably below and often well below the boiling point.

Furthermore, the foremost part of the stream of heated water which reaches the supply of comminuted coffee beans in an automatic coffee maker is relatively cold. The reason is that such foremost part of the stream of hot water exchanges some heat with the conduit (such as a riser) which conveys hot water to the holder for a bag of filter paper. As a rule, water in an automatic coffee maker is heated by an electric heater of the type known as flow-through heater, i.e., the stream of water which is permitted or caused to leave the container for fresh water flows through a conduit a certain length of which is heated from the outside and which discharges heated water into a riser serving to convey heated water to the holder for a supply of comminuted coffee beans. Therefore, many known automatic coffee makers must be equipped with specially designed means for preventing the admission of cold or tepid water into the holder during the initial stage of a brewing operation. However, such means cannot ensure that the temperature of the front part of the stream of heated water will actually reach the boiling point. This is in contrast with the making of hand brewed coffee which invariably involves, or can invariably involve, pouring of boiling water over a selected quantity of comminuted coffee beans.

In addition, when making hand brewed coffee, the container for heated water is invariably (or at least in most instances) a pot or a like vessel which is made of a tasteless material, namely a material which does not adversely influence the aroma and/or other desirable characteristics of the freshly brewed beverage. Such materials include, among others, porcelain, glass, earthenware, ceramics and the like. A person who knows how to brew high-quality coffee is not likely to employ aluminum or copper pots for the heating of water which is to be poured over a supply of comminuted coffee beans. Therefore, the implement which is used to confine water during heating and during pouring of boiling water over comminuted coffee beans will not adversely affect the aroma, color and/or other desirable characteristics of the beverage. On the other hand, the majority of automatic coffee makers employ metallic parts, especially aluminum parts, as a means for confining and guiding water preparatory to, during and after heating. Moreover, the vessels which receive a freshly brewed beverage often consist of or contain metallic materials which are contacted by the beverage. It has been found that the aroma of coffee is affected by contact of water or coffee with metallic parts, especially with parts which contain or are made of aluminum. For example, the conduit which conveys water from the container for fresh water through an electric heating unit in a standard coffee maker is normally made of aluminum. This exerts an adverse influence upon the desirable characteristics of freshly brewed coffee.

Still further, the filtering stage of a hand brewing operation is normally shorter but much more intensive than in an automatic coffee maker. The reason is that the pouring of boiling water by hand is normally a short-lasting operation but the rate of pouring is much higher than in a coffee maker. Therefore, hand pouring does not result in dissolution of bitter tasting constituents of comminuted coffee beans. On the other hand, such constituents are dissolved and leave the holder for the bag of filter paper with the freshly brewed beverage which is obtained in an automatic coffee maker.

OBJECTS OF THE INVENTION

An object of the invention is to provide a machine which can be used to brew hot beverages, such as coffee, tea and chocolate, and is constructed and assembled in such a way that its component parts do not, or are less likely to, adversely affect the aroma and/or other desirable characteristics of the beverage than in conventional machines.

Another object of the invention is to provide the machine with novel and improved means for conveying heated liquid from the locus of heating into contact with a supply of flavoring agent, such as comminuted coffee beans, tea leaves or pulverulent chocolate.

A further object of the invention is to provide an automatic machine for brewing hot beverages which is constructed and which can be operated in such a way that the quality of freshly brewed beverage at least approximates the quality of hand brewed beverages.

An additional object of the invention is to provide a novel and improved container for a supply of liquid which can be used in the above outlined machine.

A further object of the invention is to provide the machine with novel and improved means for influencing the rate of flow of heated liquid from the locus of heating to a holder for a supply of flavoring agent.

Still another object of the invention is to provide the machine with novel and improved means for influencing the temperature of liquid which is about to be conveyed to the holder for flavoring agent.

A further object of the invention is to provide a novel and improved method of heating and conveying heated liquids in automatic coffee or tea makers and analogous machines for the making of hot beverages.

A further object of the invention is to provide an automatic machine for brewing hot beverages which exhibits the above outlined features and is not bulkier or more expensive than heretofore known machines.

Another object of the invention is to provide a machine which can accept standard filter bags and can employ available heaters for liquids.

SUMMARY OF THE INVENTION

The invention is embodied in a machine for making hot beverages by contacting a heated liquid (such as boiling water and steam) with a flavoring agent (such as comminuted coffee beans or tea leaves). The improved machine comprises a container for a supply of liquid to be heated. The container consists, at least in part, of a tasteless or neutral material (namely a material which does not adversely influence the flavor and/or other desirable characteristics of the brewed beverage) and includes a plurality of communicating sections or compartments. One of the sections communicates with the atmosphere, and another section has a bottom wall preferably in close or immediate proximity to adjustable means for heating the liquid in the other section to the boiling point. The machine further comprises a holder for a supply of flavoring agent and a plurality of siphons each having an inlet in the other section of the container and an outlet serving to deliver heated liquid into contact with flavoring agent in the holder. The outlets are disposed at a level below the upper side of the bottom wall of the other section of the container, and the machine further comprises means for adjusting the heating means. Such adjusting means includes means for monitoring the temperature of liquid in at least one of the siphons, preferably in the region of the respective outlet.

The siphons define discrete paths for the flow of heated liquid (this term is intended to also embrace steam) from the other section of the container, and it is preferred to design the paths in such a way that they have different cross-sectional areas. The outlets of the siphons are preferably located above the supply of flavoring agent in the holder.

The monitoring means can include at least one differential thermometer, particularly a thermometer which employs a bimetallic thermostat.

The inlets of the siphons can be placed at different distances from the bottom wall of the other section. The arrangement is preferably such that the cross-sectional area of the path which is defined by a siphon with inlet at a greater distance from the bottom wall is greater than the cross-sectional area of the path which is defined by a siphon with inlet located nearer to the bottom wall.

The adjusting means can include means for monitoring the temperature of liquid in or at the outlet of each siphon. Such adjusting means is preferably designed to regulate the heat output of the heating means.

It is equally within the purview of the invention to place the inlets of all siphons at the same distance from the bottom wall of the other section of the container. The bottom wall can be provided with a recess or depression, and the inlet or inlets of one or more siphons can extend into such recess.

The intermediate portion of at least one of the siphons (such intermediate portions are located at levels above the respective inlets and outlets) can be provided with one or more air-admitting openings to deactivate the respective siphon when the opening or openings are permitted to admit air. Such siphon or siphons are further equipped with means for varying the rate of admission of air by way of the at least one opening. The means for varying the rate of admission of air can include one or more reciprocable or otherwise movable valving elements which are movable between a plurality of positions including a first position in which the respective opening or openings are exposed and a second position in which the respective opening or openings are sealed. Detent means can be provided to releasably hold each valving element in at least one of its positions.

The siphons and the holder can also be made of a tasteless material which does not adversely affect the characteristics of the brewed beverage.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
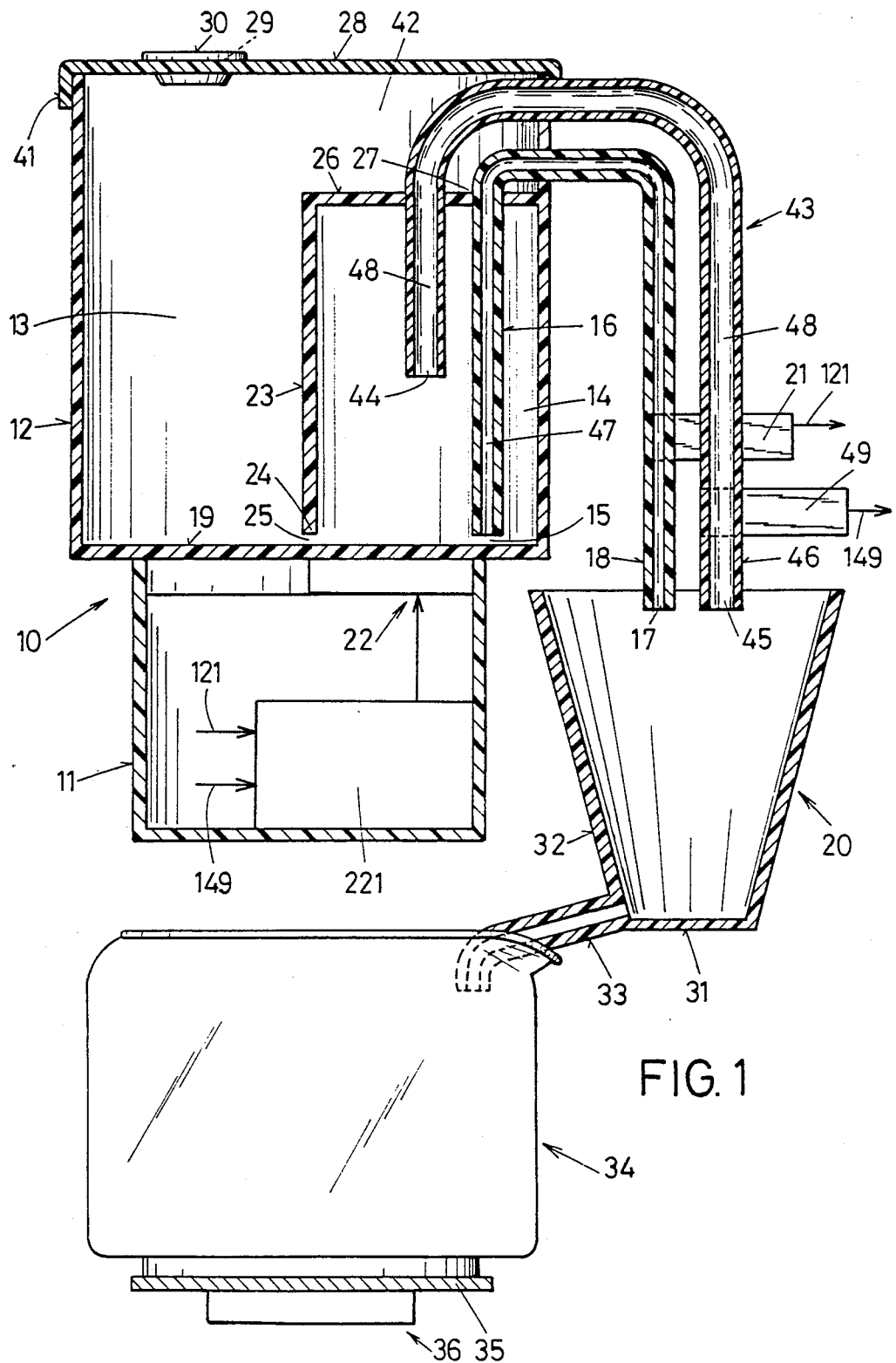
FIG. 1 is a schematic partly elevational and partly vertical sectional view of a coffee or tea making machine which embodies one form of the invention and operates with two siphons.

Referring first to FIG. 1, there are shown only those components of an automatic coffee making machine 10 which are necessary for full understanding of the invention. The drawing does not show the details of the electric circuitry, the details of means for heating a supply of liquid, the details of the housing and/or other features which are or can be identical with those in conventional coffee makers. Reference may be had to numerous United States and foreign patents and pending patent applications of the assignee of the present application and to literature which is distributed by the assignee and shows numerous commercially available coffee makers, tea makers, espresso makers and cappuccino makers. Such machines are described and shown, for example, in a pamphlet entitled "KRUPS Programme". The electrical parts of the machine 10 can be connected to a conventional outlet by an electric cable, not shown, and the base of the housing of the improved machine can be placed on a table, a counter or any other suitable support.

The housing 11 of the machine 10 contains or confines a container 12 for a supply of fresh liquid, such as tap water. The housing 11 is made of an insulating material and contains the aforediscussed elements of the electric circuitry including an electric heater 22 of any known design. The aforementioned electric cable extends from the housing 11 and carries a plug for insertion into a household outlet or the like.

The container 12 has a bottom wall 19 a portion of which is immediately adjacent the electric heater 22. However, the latter cannot come in actual contact with the liquid which is confined in the container 12. All that counts is to ensure satisfactory transfer of heat between the heater 22 and the supply of liquid in the space immediately above the right-hand portion of the bottom wall 19. The capacity and the dimensions of the heater 22 depend upon the capacity of the container 12, i.e., on the desired quantity of liquid which is to be heated in the smaller of two compartments or sections 13, 14 of the container. For example, the capacity of the container 12 can be selected in such a way that the machine 10 can supply a maximum of twelve cups of hot coffee without refilling the container.

In accordance with a feature of the invention, the container 12 is made of a tasteless or neutral material, namely a material which cannot adversely influence the aroma and/or other desirable characteristics of the beverage which is brewed in the machine 10. It is preferred to avoid the use of metallic materials, such as copper and aluminum. As mentioned above, the material of which the heater 22 is made cannot influence the aroma and/or other characteristics of the beverage because the heater cannot come in direct contact with cold, tepid or hot water. This is in contrast with immersion heaters which must dip into the supply of liquid to be heated thereby.

The sections 13 and 14 of the container 12 are in permanent communication with each other because the lower end 24 of the vertical wall 23 of the partition between these sections does not extend all the way to the bottom wall 19, i.e., the walls 19 and 23 define a clearance or gap 25 to permit liquid to flow between the internal spaces of the sections 13, 14 during each stage of operation of the machine 10 and as long as at least one of the sections contains some liquid. The section 13 communicates with the atmosphere and is substantially (but not entirely) separated from the section 14 by the aforementioned partition which includes the upright wall 23 and a horizontal wall 26. The wall 23 is parallel to two outer walls of the container 12, and the wall 26 is preferably horizontal and extends at right angles to all upright walls of the container. When the machine 10 is in use, i.e., when the container 12 contains a supply of liquid and the heater 22 is on, the section 14 acts as a plenum chamber because it confines a supply of boiling water and steam and the pressure therein then exceeds atmospheric pressure.

The top wall 28 of the container 12 constitutes an at least partially detachable (e.g., pivotable) closure or lid. The mounting of the top wall 28 can be such that the section 13 communicates with the atmosphere even when the top wall is properly mounted on the upper end portions of the sidewalls. Alternatively, and as actually shown in FIG. 1, the top wall 28 can be provided with at least one opening 29 which establishes communication between the atmosphere and the interior of the section 13. If it is desired to reduce the extent of such communication, the container 12 can be furnished with a bung or a like device 30 which fits into the opening 29 and is provided with one or more smaller openings (e.g., with a single centrally located opening) to ensure that the interior of the section 13 can communicate with the atmosphere even if the bung 30 is inserted into the opening 29 of the top wall 28. Other means for establishing communication between the interior of the section 13 and the atmosphere can be used with equal or similar advantage.

The machine 10 further comprises a substantially funnel-shaped holder 20 for a supply of flavoring agent, e.g., comminuted coffee beans in a suitable bag of filter paper or the like (not shown in FIG. 1). The means for conveying boiling liquid and steam from the smaller section 14 of the container 12 onto the supply of flavoring agent in the holder 20 includes two inverted U-shaped siphons 16 and 43. The inlet 15 in the shorter left-hand branch of the siphon 16 is rather closely adjacent the upper side of the bottom wall 19 in the section 14, and the outlet 17 in the longer branch 18 of the siphon 16 is located at a level below the bottom wall 19 (or at least below the upper side of the bottom wall 19 in the section 14) and can discharge boiling liquid and steam directly onto the supply of flavoring agent in the holder 20. The horizontal wall 26 of the partition has a hole 27 which sealingly receives a portion of the siphon 16, and a similar hole for the siphon 16 is provided in the adjacent upright wall of the container 12. The upper side of the bottom wall 19 can be provided with a depression which receives the inlet 15 of the siphon 16 to thus ensure that this siphon can evacuate the entire contents of the container 12, either alone or in conjunction with the siphon 43.

The longer branch 18 of the siphon 16 carries a temperature monitoring device 21, preferably in the form of a so-called differential thermometer which can include a bimetallic thermostat and is installed at or close to the outlet 17 to monitor the temperature of liquid flowing along the path 47 which is defined by the siphon 16. The thermometer 21 can be a commercially available device which can generate signals when the monitored temperature is above or below a preselected optimum range, particularly above such range. The signals are transmitted by conductor means 121 to a means 221 for adjusting the heater 22 so that the heat output of the heater is reduced when the temperature of the stream of liquid flowing toward the outlet 17 is too high. The adjusting means 221 (the thermometer 21 can be said to form part of such adjusting means) is installed in the housing 11.

In accordance with a presently preferred embodiment, the thermometer 21 comprises at least one bimetallic strip or disc which changes its position and/or shape as a result of heating; such changes in position and/or shape are used to transmit signals which influence the adjusting means 221 to change the heat output of the heater 22 in order to ensure that the temperature of liquid flowing toward the outlet 17 of the siphon 16 will remain within a desired optimum range. The adjusting means 221 can be designed to reduce the heating action of the heater 22 upon the body of liquid in the section 14 of the container 12 when the temperature of liquid in the branch 18 of the siphon reaches a preselected value or to completely turn off the heater when the temperature of liquid flowing toward the outlet 17 is too high.

The second siphon 43 has a shorter branch with an inlet 44 in the interior of the section 14 at a substantial distance from the bottom wall 19, and a longer branch 46 with an outlet 45 adjacent the outlet 17 of the siphon 16. The cross-sectional area of the path 48 which is defined by the siphon 43 is larger than that of the path 47 for the flow of heated liquid through the siphon 16. The siphon 43 also extends through the wall 26 of the partition and through the adjacent upright sidewall of the container 12 to deliver a stream of heated liquid onto the supply of flavoring agent in the holder 20. The outlet 45 of the longer branch 46 of the siphon 43 is also located at a level beneath the upper side of the bottom wall 19 of the container 12.

The branch 46 of the siphon 43 carries a second differential thermometer 49 (e.g., a thermometer including a bimetallic thermostat) which is adjacent the outlet 45 and is or can be identical with the thermometer 21. The conductor means which transmits signals from the thermometer 49 to the adjusting means 221 in the housing 11 is shown at 149. The purpose of the thermometer 49 is analogous to that of the thermometer 21, i.e., each of these thermometers can generate signals which are used to reduce or terminate the heating action of the heater 22 upon the body of liquid in the section 14 of the container 12. It is normally desirable to select the thermometers 21 and 49 in such a way that they generate signals in response to detection of different temperatures of liquid in the longer branches of the respective siphons 16 and 43.

If the machine 10 is to brew a larger quantity of a beverage (e.g., coffee), the container 12 is filled with fresh water to such an extent that the upper level of the body of liquid in the container extends above the level of the inlet 44 of the larger-diameter siphon 43. Thus, when the on-off switch of the electrical control means is actuated to turn on the heater 22, the latter heats the supply of water in the section 14 and boiling water is caused to flow via siphons 16 and 43 to be discharged onto the supply of flavoring agent in the holder 20. The level of liquid in the container 12 sinks and the rate of liquid flow from the section 14 into the holder 20 is reduced considerably when the liquid level descends below the inlet 44 of the siphon 43. However, the siphon 16 continues to convey boiling water from the section 14 into the holder 20 until the supply of liquid in the container 12 is exhausted, especially if the inlet 15 extends into the aforementioned depression or recess in the upper side of the bottom wall 19. The flow of boiling water from the section 14 into the holder 20 is continuous irrespective of whether such liquid is conveyed by the siphons 16 and 43 or only by the siphon 16.

An advantage of the machine 10 is that a large quantity of boiling liquid is delivered into the holder 20 at the very start of the brewing operation, i.e., the same as when the brewing is carried out by hand.

If the machine 10 is to brew a relatively small quantity of a hot beverage, the container 12 receives only a small quantity of fresh liquid. For example, if the machine 10 is to supply two cups of hot coffee, the container 12 will be filled to a level below the inlet 45 of the siphon 43. Moreover, the machine 10 can be furnished with means (not specifically shown) for sealing the inlet 45 so that boiling liquid cannot enter the shorter branch of the siphon 43. The supply of boiling liquid is then transferred into the holder 20 exclusively along the relatively narrow path 47 which is defined by the siphon 16. This entails a relatively long interval of brewing of a hot beverage which is to fill two cups.

The exact design of the holder 20 forms no part of the invention. This holder is preferably made of a neutral or tasteless material which does not adversely influence the aroma and/or other desirable characteristics of the beverage leaving the holder 20 by way of a nipple 33 at the junction of the hollow frustoconical sidewall 32 and bottom wall 31 of the holder. The siphons 16 and 43 are also made of a tasteless or neutral material, e.g., the same material as that of the container 12 and/or holder 20. The holder 20 can be made of a plastic material. The configuration of the holder 20 is such that it can readily accept and properly orient a standard bag of filter paper or the like.

The nipple 33 of the holder 20 discharges a stream of hot beverage into a vessel 34, e.g., a coffee pot which can be made of glass or any other suitable material that does not adversely affect the aroma and/or other desirable characteristics of the beverage.

The vessel 34 rests on a prewarming plate 35 which is heated by a second heater 36 so that the temperature of the beverage in the vessel 34 remains at or close to a desired level. The heat output of the heater 36 for the prewarming plate 35 can be a fraction of the heat output of the heater 22 for the supply of liquid in the container 12.

The top wall or cover 28 of the container 12 has a downwardly extending rim 41 which surrounds the adjacent upper end portions of upright sidewalls of the container. A first part of the section 13 of the container 12 is adjacent the upright wall 23 of the partition, and a second part 42 of the section 13 overlies the horizontal wall 26 of the partition.

It is already known to employ a siphon in a coffee or tea making machine. Reference may be had to German Utility Model No. 8 708 082 which discloses a so-called flow-through heater for a stream of water flowing toward a hot water container. The latter communicates with the holder for comminuted coffee beans or tea leaves by way of a siphon. The liquid discharging longer branch of the siphon in the machine of the Utility Model extends with clearance through an opening in the bottom wall of the container, and such clearance can be filled with a sealing element. The siphon is mounted for movement in the longitudinal direction of its longer branch so as to expose and seal the clearance.

A drawback of the just discussed conventional machine is that it employs a through-flow heater which can affect the flavor of the beverage because it includes a metallic conduit for the liquid to be heated. Moreover, the container which collects heated water downstream of the flow-through heater must be provided in addition to the container for fresh water. This contributes to the bulk and cost of the machine which is disclosed in the Utility Model.

Figure 2:
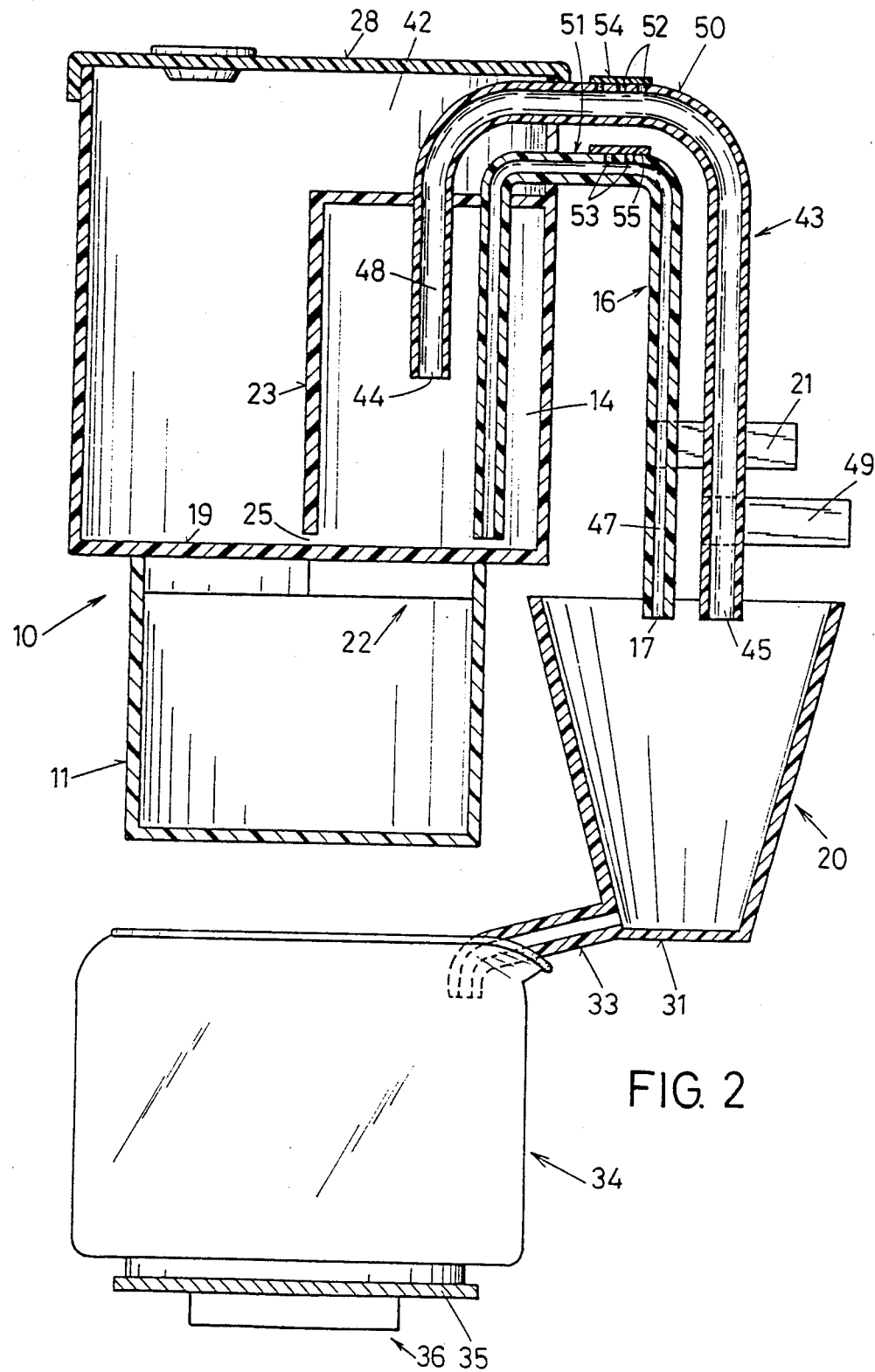
FIG. 2 is a similar view of a machine with modified siphons.

The machine 10 of FIG. 2 departs from the machine of FIG. 1 only in the design of the siphons 16 and 43. All such parts of the machine 10 of FIG. 2 which are identical with or clearly analogous to corresponding parts of the machine of FIG. 1 are denoted by similar reference characters.

The intermediate portion 50 of the larger-diameter siphon 43 extends to a level well above the inlet 44 and outlet 45 and has several openings 52 which can be sealed or exposed by a reciprocable valving element 54. Analogously, the intermediate portion 51 of the siphon 16 has several openings 53 which can be sealed or exposed by a reciprocable valving element 55. The valving elements 54 and 55 are shown in those end positions in which the respective openings 52 and 53 are sealed, and each of these valving elements can be moved to at least one other position, namely a position in which the respective openings are exposed. FIG. 2 shows the valving elements 54, 55 in their sealing positions, i.e., the siphons 16 and 43 are operative to convey boiling liquid and steam from the compartment or section 14 of the container 12 into the holder 20 for a supply of flavoring agent. Thus, the operation of the machine 10 of FIG. 2 (with the valving elements 54 and 55 in sealing positions) is identical with that of the machine 10 of FIG. 1.

The valving element 54 and/or 55 can be manipulated by hand to assume its other end position in which the respective openings 52 and 53 are exposed or in which at least one of the respective openings is exposed. This enables the person in charge to select the duration, timing and intensity of boiling action by the simple expedient of deactivating the siphon 16 and/or 43.

As can be seen in FIG. 2, the siphons 16, 43 on the one hand and the corresponding valving elements 54, 55 on the other hand are provided with cooperating detent means for releasably holding the valving elements in selected positions. Such detent means comprise shallow recesses or notches in the external surfaces of the siphons and complementary protuberances on the valving elements and/or vice versa. Other types of detent means can be used with similar or equal advantage. The valving elements 54, 55 can include annuli which surround the intermediate portions 50, 51 of the respective siphons, or they may constitute slides which are reciprocable along tracks provided therefor on the respective intermediate portions. It is also possible to employ valving elements which are turnable between sealing and inoperative positions.

Figure 3:
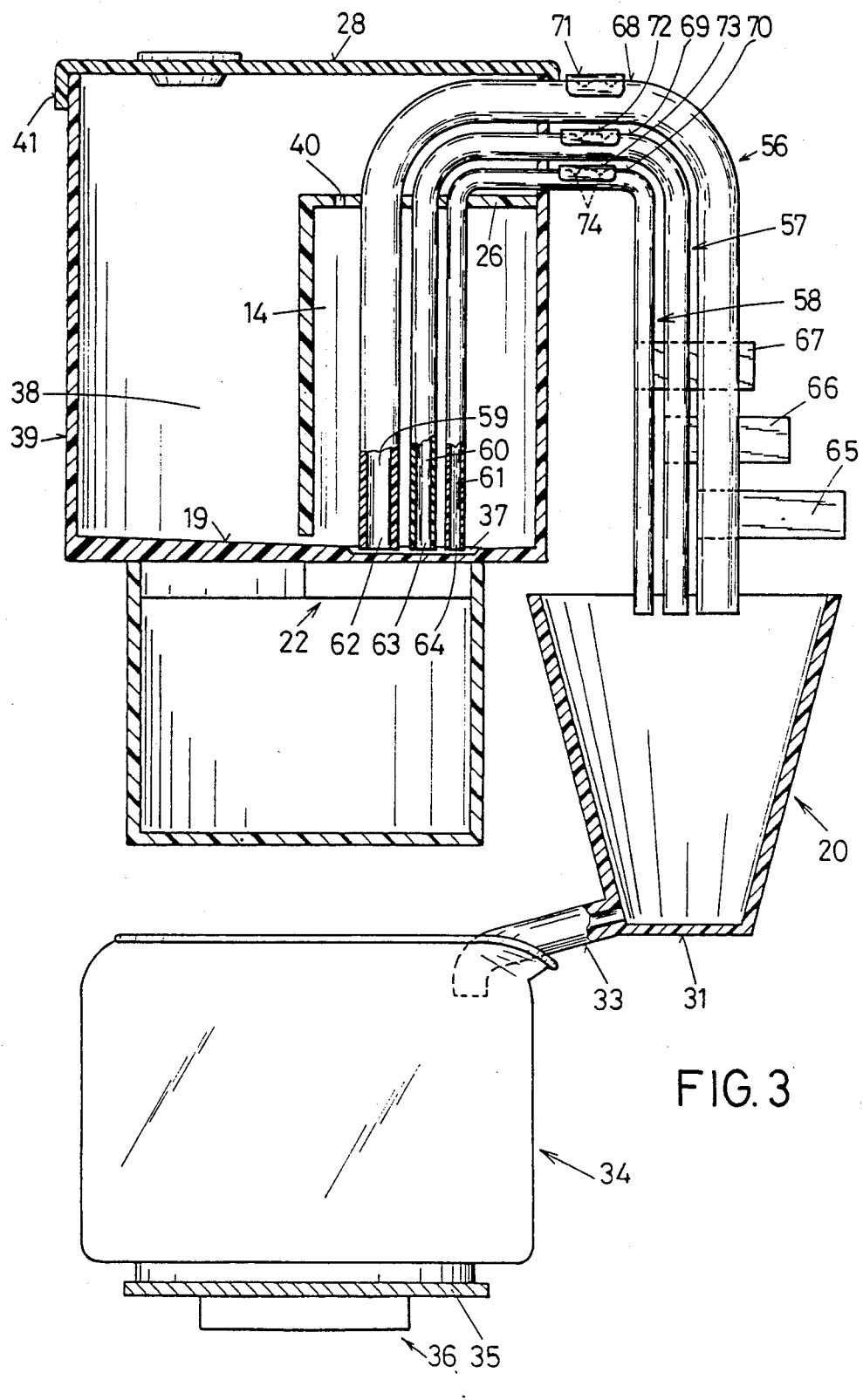
FIG. 3 is a similar view of a machine with three siphons.

FIG. 3 shows certain components of a third beverage brewing machine wherein some of the parts which are identical with or clearly analogous to corresponding parts of the machine 10 of FIG. 1 are denoted by similar reference characters. This machine comprises three inverted U-shaped siphons 56, 57, 58 having inlets 62, 63, 64 at the same level in the interior of the smaller section 14 of the container 39, and outlets disposed at the same level above the supply of flavoring agent in the interior of the holder 20. The inlets 62–64 extend into a relatively shallow recess or depression 37 in the upper side of the bottom wall 19 of the container 39. The smaller section 14 communicates with the larger section 38 in the same way as in the embodiment of FIG. 1 and also by way of an aperture 40 in the horizontal wall 26 of the partition between the sections 14 and 38.

The outlets of the siphons 56–58 are located at a level below the bottom surface in the recess 37 of the bottom wall 19.

The siphon 56 defines a passage or path 59 having a diameter (and hence a cross-sectional area) greater than the diameter of the passage 60 in the siphon 57. The diameter of the passage 60 is greater than that of the passage 61 in the siphon 58.

The upwardly extending intermediate portions 68, 69 and 70 of the siphons 56, 57, 58, respectively, are provided with openings 74 which can be exposed by discrete valving elements 71, 72 and 73. Each intermediate portion can be provided with one, two or more openings 74. FIG. 3 shows the three valving elements 71 to 73 in sealing positions, i.e., all three siphons are in condition to convey boiling liquid from the recess 37 (namely from the deepmost portion of the interior of the section 14) into the holder 20. However, the person in charge can deactivate one, two or all three siphons by the simple expedient of shifting or otherwise moving the respective valving element to a position in which at least one copending 74 in the selected siphon or siphons admits air into the interior of the respective intermediate portion.

If all three siphons are ready to convey heated liquid from the section 14 into the holder 20, the transfer of a large quantity of liquid is completed within a very short interval of time. However, and as already described above, the person in charge is in a position to select the intensity of boiling, the duration of boiling and the length of the interval which elapses for transfer of a selected quantity of boiling liquid from the section 14 into the holder 20 by the expedient of moving at least one of the valving elements 71 to 73 to its inoperative position.

The longer branches of the siphons 56 to 58 respectively carry thermometers 65, 66 and 67 each of which can be identical with the thermometer 21 or 49. These thermometers form part of the means (not shown in FIG. 3) for adjusting the heating action of the heater 22 for the body of liquid in the section 14 of the container 39. The thermometer 65, 66 or 67 can but need not be identical with the other two thermometers, and each of these thermometers can be set to transmit a signal at the same temperature or at a different temperature.

The purpose of the aperture 40 in the wall 26 of the partition between the sections 38 and 14 of the container 39 is to enable air to escape from the upper part of the section 14 when the cover 28 is removed or pivoted to open position and the container 39 is in the process of receiving a supply of fresh liquid. The illustrated aperture 40 is relatively small so that it only permits gradual escape of air from the upper part of the section 14. However, it is equally possible to provide the wall 26 with two or more apertures 40 or with a single large-diameter aperture which can be sealed with a plug or the like. The plug is withdrawn from the single aperture during filling of the container 39 to permit rapid escape of air from the section 14, and the plug is thereupon reinserted to prevent developing steam from flowing from the upper part of the section 14 into the section 38.

The depression or recess 37 in the bottom wall 19 can be omitted if the upper side of the bottom wall is inclined in such a way that liquid in the container 39 tends to flow toward the inlets 62–64 of the siphons 56–58. Alternatively, the recess 37 can be provided in a bottom wall which is inclined in the just outlined manner; this even more reliably ensures that the siphons 56–58 can evacuate the entire supply of liquid from the container 39, i.e., that the quantity of beverage in the vessel 34 will closely approximate the quantity of fresh liquid which was admitted into the container 39.

The improved machine is susceptible of many additional modifications without departing from the spirit of the invention. For example, the configuration and/or the dimensions of the siphons can vary within a wide range, the same as the number of siphons and the cross-sectional areas of paths which are defined by the siphons. Still further, the branch 48 of the siphon 43 of FIGS. 1 and 2 can be assembled of two or more tubular elements which are slidably telescoped into each other so as to enable the person in charge to select the distance of the inlet 44 from the upper side of the bottom wall 19.

It is further within the purview of the invention to equip at least one of the siphons with two or more identical or different thermometers which monitor the temperature of conveyed liquid. If a siphon carries two or more thermometers, they may but need not be identical and they may but need not generate signals in response to detection of one and the same temperature of the conveyed liquid.

Still further, the invention can be embodied in all kinds of coffee making, tea making and other brewing machines wherein one or more streams of heated liquid are to be conveyed from one or more heaters to one or more consumers, such as one or more holders for supplies of flavoring agent.

The container 12 or 39 can comprise three or more sections, e.g., as many as n+1 sections wherein n is the number of siphons. The shorter branch of each siphon can dip into a discrete section of the container. This would be tantamount to subdivision of the section 14 into two or more smaller sections.

An important advantage of the improved machine is that the parts which come in actual contact with the liquid prior, during or after heating cannot adversely affect the aroma and/or other desirable characteristics of the beverage. This is achieved by the novel expedient of making all liquid-contacting parts of a tasteless or neutral material such as ceramic, porcelain, earthenware, glass, certain types of plastics and others. The liquid-contacting parts include the container, the siphons, the holder for flavoring agent and the vessel for the beverage which insures from the holder.

Since the sections of the container 12 or 39 are in permanent communication with each other and the section 13 or 38 is free to communicate with the atmosphere, the level of liquid in the section 14 is the same as that of liquid in the section 13 or 38. The heating action of the heater 22 can be concentrated upon a relatively small part of the bottom wall 19, namely on the part beneath the section 14 which receives the inlets of the siphons. The entire container 12 or 39 can be made of a single piece of suitable plastic or other neutral or tasteless material. This contributes to simplicity and lower cost of the entire machine because it is not necessary to provide seals between the sections of the container. The placing of the gap 25 at a considerable distance from the locus of steam generation (in the upper part of the section 14) also contributes to superior heating action because steam cannot escape into the section 13 or 38 by flowing along the upper side of the bottom wall 19, i.e., through the gap 25. Therefore, steam in the upper part of the section 14 forces boiling liquid into the inlets of the siphons and thus initiates an uninterrupted flow of boiling liquid from the section 14 toward and into the holder 20. Such flow is terminated only when the supply of liquid in the container 12 or 39 is exhausted except that, in the embodiments of FIGS. 2 and 3, the person in charge can intentionally interrupt the flow of heated liquid by exposing one or more openings in the intermediate portion or portions of one or more siphons. Continuous and smooth flow of heated liquid is preferred to the flow in spurts because it ensures a more predictable contact between the supply of flavoring agent and the heated liquid.

A further important advantage of the improved machine is that the thermometer or thermometers of its means 221 for adjusting the heater 22 monitor the temperature of heated liquid, preferably close to the outlet or outlets of the respective siphon or siphons. The advantage of such thermometer or thermometers will be readily appreciated by bearing in mind that the supply of liquid in the container 12 or 39 decreases when the machine is in actual use, i.e., when boiling liquid flows from the section 14 into the holder 20. If the heating action of the heater 22 were to remain unchanged, the section 14 of the container would accumulate a large quantity of vaporized liquid which would result in more pronounced agitation, bubbling and spraying as the supply of liquid in the container decreases. All this can be avoided by the simple expedient of monitoring the temperature of flowing liquid in at least one of the siphons and by adjusting the heat output of the heater 22 accordingly. A bimetallic thermometer has been found to be quite satisfactory, i.e., it is not absolutely necessary to directly measure the temperature of heated liquid in one or more siphons. The reason is that the wall of the siphon rapidly assumes a temperature which matches or approximates the temperature of liquid in the siphon so that the wall of the siphon can properly influence the bimetallic strip or disc of a bimetallic thermometer in order to generate signals which are used to adjust the heat output of the heater 22 by way of the adjusting means 221. The bimetallic thermometer can react practically instantaneously so that it can initiate an adjustment of heating action beneath the bottom wall 19 shortly after heated liquid begins to flow through the respective siphon. The thermometer or thermometers can be used to generate signals which prevent an overheating and excessive bubbling of relatively small quantities of liquid in the section 14 of the container 12 or 39 or to completely shut off the heater 22.

The improved machine can employ a single thermometer for each siphon, a plurality of thermometers for a single siphon, a single thermometer for a single siphon, or a plurality of thermometers for each siphon. If the machine employs two or more thermometers, each thermometer can respond to the same temperature or each thermometer can respond to a different temperature, depending on the nature and the intended mode of operation of the adjusting means 221.

Without further analysis, the foregoing will so fully reveal the gist of the present invention that others can, by applying current knowledge, readily adapt it for various applications without omitting features that, from the standpoint or prior art, fairly constitute essential characteristics of the generic and specific aspects of my contribution to the art and, therefore, such adaptations should and are intended to be comprehended within the meaning and range of equivalence of the appended claims.

I claim:

1. A machine for making hot beverages by contacting a heated liquid with a flavoring agent, comprising a container for a supply of liquid to be heated, said container consisting at least in part of a tasteless material and including a plurality of communicating sections, one of said sections communicating with the atmosphere and another of said sections including a bottom wall having an upper side; adjustable means for heating the liquid in said other section to the boiling point; a holder for a supply of flavoring agent; a plurality of siphons each having an inlet in said other section and an outlet arranged to deliver heated liquid into contact with flavoring agent in said holder, said outlets being disposed at a level below the upper side of the bottom wall of said other section; and means for adjusting said heating means, including means for monitoring the temperature of liquid in act least one of said siphons, particularly in the region of the respective outlet.

2. The machine of claim 1, wherein said siphons define discrete paths for the flow of heated liquid from said other section, said paths having different cross-sectional areas.

3. The machine of claim 2, wherein said outlets are disposed at a level above the supply of flavoring agent in said holder.

4. The machine of claim 2, wherein said monitoring means includes at least one differential thermometer.

5. The machine of claim 2, wherein said inlets are loc:ated at different distances from said bottom wall.

6. The machine of claim 5, wherein said siphons include a first siphon defining a path of larger cross-sectional area and a second siphon defining a path of smaller cross-sectional area, the inlet of said first siphon being more distant from said bottom wall than the inlet of said second siphon.

7. The machine of claim 2, wherein said adjusting means includes means for monitoring the temperature of liquid at or close to the outlet of each of said siphons.

8. The machine of claim 2, wherein said adjusting means constitutes a means for regulating the heat output of said heating means.

9. The machine of claim 2, wherein said monitoring means includes at least one bimetallic thermometer.

10. The machine of claim 2, wherein said inlets are located substantially at the same distance from said bottom wall.

11. The machine of claim 10, wherein said siphons include intermediate portions between and at levels above the respective inlets and outlets and at: least one of said intermediate portions has at least one air admitting opening, and further comprising means for varying the rate of air admission by way of said at least one opening.

12. The machine of claim 11, wherein the intermediate portion of each of said siphons has an air admitting opening and said means for varying the rate of air admission comprises at least one valving element movably mounted on the respective intermediate portion.

13. The machine of claim 11, wherein said means for varying the rate of air admission includes a valving element which is movable between at least two positions in one of which the at least one opening is exposed and in the other of which said at least one opening is sealed.

14. The machine of claim 13, further comprising detent means for releasably holding said valving element in at least one of said positions.

15. The machine of claim 2, wherein said bottom wall has a recess and at least one of said inlets extends into said recess.

16. The machine of claim 2, wherein said siphons and said holder consist, at least in part, of a tasteless material.

17. The machine of claim 1, wherein said bottom wall slopes downwardly toward at least one of said inlets.

18. The machine of claim 1, wherein said container has a top wall and said one section communicates with the atmosphere in the region of said top wall.

19. The machine of claim 1, wherein said outlets are disposed at the same level.

20. The machine of claim 1, further comprising means for influencing the rate of flow of heated liquid through at least one of said siphons.

* * * * *

UNITED STATES PATENT AND TRADEMARK OFFICE
CERTIFICATE OF CORRECTION

PATENT NO. : 4,922,809
DATED : May 8, 1990
INVENTOR(S) : Hubert FÜHNER

It is certified that error appears in the above-identified patent and that said Letters Patent is hereby corrected as shown below:

On the title page, FOREIGN APPLICATION PRIORITY DATA:
"May 5, 1989" should read --May 5, 1988--.
Col. 10, line 16, "copending" should read --opening--.
Col. 11, line 26, "n", both occurrences, should read --$\underline{n}$--;
line 41, "insures" should read --issues--.
Col. 13, line 11, "act" should read --at--.
Col. 14, line 6, delete ":".

Signed and Sealed this

Twenty-fourth Day of September, 1991

Attest:

HARRY F. MANBECK, JR.

Attesting Officer      Commissioner of Patents and Trademarks